Nov. 27, 1923.
K. SWANJORD
PRESSURE GAUGE
Filed May 1, 1920
1,475,252
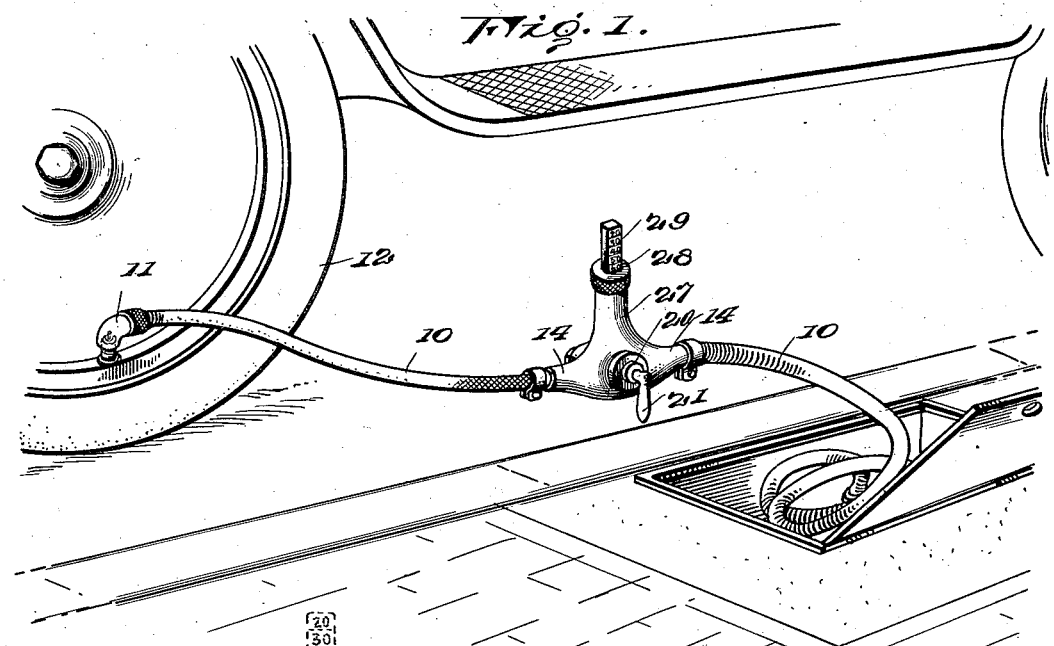
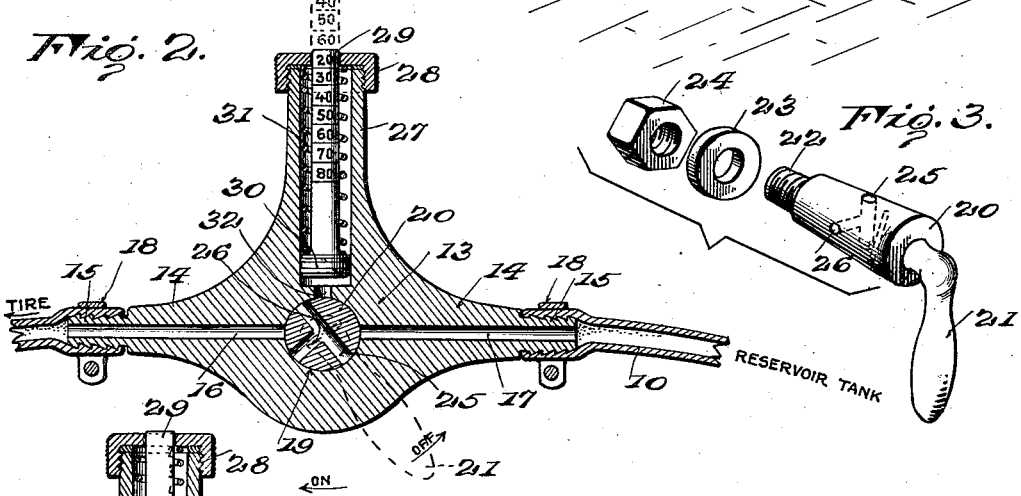
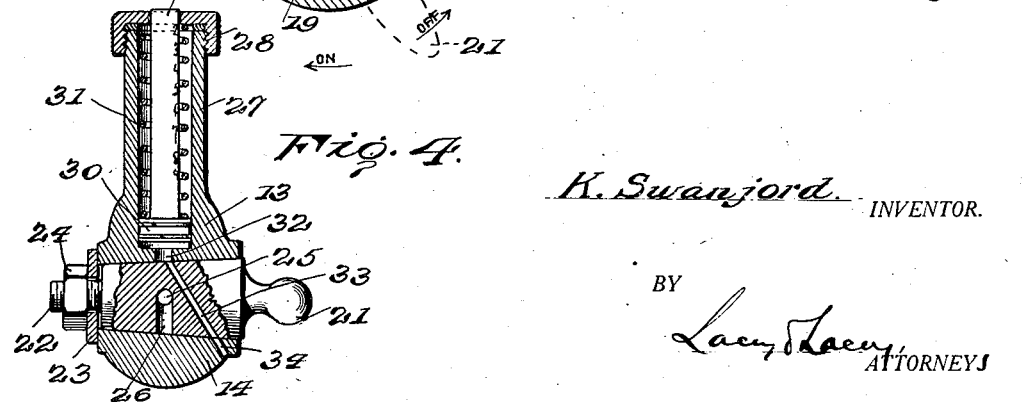
K. Swanjord, INVENTOR.
BY Lacy & Lacy, ATTORNEYS Patented Nov. 27, 1923.

1,475,252

UNITED STATES PATENT OFFICE.

KNUTE SWANJORD, OF BALATON, MINNESOTA.

PRESSURE GAUGE.

Application filed May 1, 1920. Serial No. 378,323.

*To all whom it may concern:*

Be it known that I, KNUTE SWANJORD, citizen of the United States, residing at Balaton, in the county of Lyon and State of Minnesota, have invented certain new and useful Improvements in Pressure Gauges, of which the following is a specification.

This invention relates to an improved pressure gauge especially designed for use in connection with the inflation of pneumatic tires and has as one of its principal objects to provide a device of this character which may be interposed in the delivery hose of an air supply tank or other source of air supply so that the gauge will always be convenient for testing the air pressure of a tire, incident to the inflation thereof.

The invention has as a further object to provide a gauge employing a valve which may be operated to control the flow of air through the delivery hose so that the inflation of the tire may be readily controlled.

A still further object of the invention is to provide a gauge wherein the valve may, without causing the gauge to register, be moved to one position for inflation of the tire and may then be moved to another position cutting off the air supply and simultaneously causing the gauge to register the air pressure in the tire entirely uninfluenced by the pressure of the air supply.

And the invention has as a still further object to provide a device which will be accurate and dependable and which will be characterized by structural simplicity.

Other and incidental objects will appear hereinafter.

In the drawings:

Figure 1 is a perspective view showing my improved air gauge interposed in the ordinary delivery hose of an air supply tank, the hose being illustrated as connected to the valve of a tire of a motor vehicle.

Figure 2 is a vertical section taken medially through the device.

Figure 3 is a perspective view showing the gauge valve in detail, and

Figure 4 is a vertical section taken at substantially right angles to Figure 2.

Referring now more particularly to the drawing, it will be noted that I have shown my improved gauge in connection with the ordinary delivery hose 10 of an air supply tank, this hose being provided at its outer end with a valve connection 11 of conventional type. In Figure 1, this valve connection is shown as engaged over the casing of the valve of one of the tires 12 of a motor vehicle. As is usual, the connection 11 is of such construction that when engaged with a tire valve casing, said connection will serve to depress the stem of the valve for holding the valve open, thus permitting a flow of air into the tire and, in the present instance, a flow of air from the tire to the gauge.

In carrying the invention into effect, my improved gauge is formed with a body 13 provided at opposite sides thereof with reduced alined extensions 14 at the outer ends of which are nipples 15. Through the body are alined horizontal passages 16 and 17 respectively, opening through said nipples and, as will now be observed, the hose 10 is split preferably at a point adjacent the outer end thereof, when the severed ends of the hose are fitted over the nipples 15 for thus operatively connecting the device with the hose. Preferably, clamping collars 18 are employed for securing the hose to said nipples. Formed through the body medially thereof is a valve chamber 19 lying at substantially right angles to the passages 16 and 17, which the chamber intersects, and rotatably fitted through said chamber is the plug of the control valve 20 employed. Extending from the outer end of the valve plug is a lever or handle 21 and formed on the inner end of the plug is a reduced threaded stud 22 over which is fitted a washer 23 while a nut 24 is threaded upon the stud for thus rotatably securing the valve in place. Through the valve plug is formed a passage 25 adapted to register, in one position of the valve, with the passages 16 and 17 and lying at substantially right angles to the passage 25 is a branch passage 26 in the plug.

Formed on the body 13 of the gauge medially thereof is an upstanding cylinder 27 upon the upper end of which is threaded a cap 28 and freely movable through said cap is a plunger 29 which may be squared to coact with the cap so as to be held against rotation. At its inner end the plunger is provided with a piston 30 slidable within said cylinder. As will be observed, the plunger is suitably calibrated and bearing between the piston and the cap is a helical spring 31 surrounding the plunger and normally acting to hold the plunger retracted. Leading from the valve chamber 19 of the gauge body through the bottom of the cylinder is a passage 32 and, as will now be observed, the valve may be moved to bring the branch passage 26 thereof into register with the passage 16 of the valve body when the passage 25 of the plug will register at one end with the passage 32. Formed through the valve plug is a vent passage 33 which, when the plug is turned to bring the passage 25 thereof into register with the passages 16 and 17 of the valve body, will register at one end with the passage 32 and at its opposite end with a passage 34 in the valve body, the latter passage leading to the atmosphere.

As will now be readily understood in view of the preceding description, after the connection 11 of the hose 10 has been applied to the casing of the tire valve, as shown in Figure 1, the handle 21 of the valve 20 of the gauge may be turned to horizontal position when air will be permitted to flow from the supply tank into the tire for inflating the tire. Then, by swinging the handle of the valve in a direction opposite to its first movement, the air supply from the tank may be cut off and coincidently, air from the tire may be let into the gauge cylinder when the plunger will, as will be well understood, be projected for registering the air pressure in the tire. Should it then be desired to admit additional air to the tire, the handle may simply be returned to the first position indicated when, as will be noted, the air previously admitted to the cylinder 27 will be permitted to escape through the passages 33 and 34. Consequently, the plunger will be permitted to quickly return to its position ready for a new test. Accordingly, by properly rocking the valve lever back and forth air may be admitted to the tire, and the air pressure in the tire then tested as additional air is admitted thereto so that the tire may be quickly and easily inflated as desired, it being particularly observed in this connection that when air pressure is admitted to the plunger cylinder of the gauge, the valve will completely cut off the supply of air so that the air pressure in the supply tank will not affect the accuracy of the gauge. It will accordingly be seen that I provide a particularly simple and effective device for the purpose set forth and while I have shown and described this gauge in connection with the delivery hose of an air supply tank, still I do not wish to be limited in this regard since the gauge may, of course, be otherwise employed as, for instance, in connection with a hand pump. I accordingly reserve the right to all such adaptations of the invention as may fall within the spirit of the appended claim.

Having thus described the invention, what is claimed as new is:

A device of the class described comprising a valve casing, a seat formed in said casing, a valve body revolubly mounted in said seat and having three intercommunicating ports, a nozzle on said casing adapted to connect with a pressure source and having a passage leading into said seat, a second nozzle adapted to connect with the pressure receiving element and a passage in said second nozzle leading to said seat, said valve casing having a chamber in communication with said seat and said valve body having a vent communicating with the atmosphere; said ports and vent being so situated with relation to each other that flow of pressure fluid will take place through the passages from said first to said second nozzle, while said chamber connects with the atmosphere through said vent, when the valve body stands in one position; and that said passage in said first nozzle is closed and said chamber connects with the passage of said second nozzle, while said vent is being closed, when the valve body stands in the second position, and with the valve body in the third position both of said passages as well as the chamber are closed.

In testimony whereof I affix my signature in presence of two witnesses.

KNUTE SWANJORD. [L. S.]

Witnesses:
A. M. MOORE,
E. A. ROLLOFF.